March 25, 1952 B. C. ROEHRL 2,590,824
BATTERY
Filed Feb. 23, 1951

Inventor
Bruno C. Roehrl
By
Ralph Hammar
Attorney

Patented Mar. 25, 1952

2,590,824

UNITED STATES PATENT OFFICE 2,590,824

BATTERY

Bruno C. Roehrl, Erie, Pa., assignor to National Organ Supply Company, Erie, Pa., a corporation of Pennsylvania Application February 23, 1951, Serial No. 212,347

3 Claims. (Cl. 136—133)

This invention is intended to produce a sealed battery particularly useful in applications where space is at a premium. In a preferred form, the electrodes are in the form of opposed cups having rims received in a groove in an annular elastic gasket of material not attacked by battery acids or alkalies. The seal is effected by thermoplastic cam rings which squeeze the gasket against the rims and which are integrally cemented together to hold the sealing pressure. Further objects and advantages appear in the specification and claims.

Figure 1:
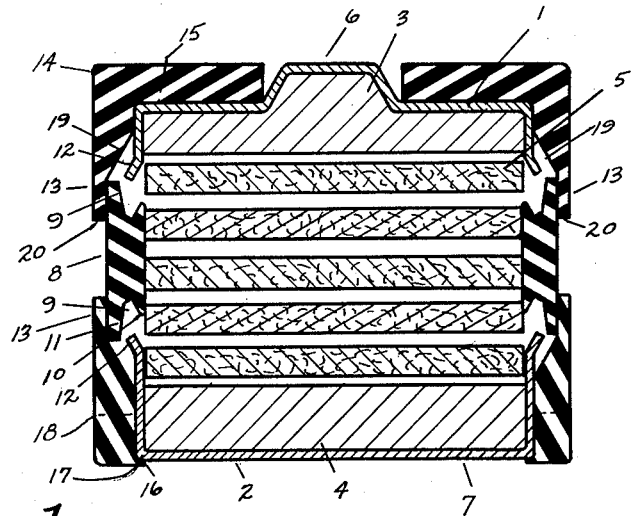
Figure 2:
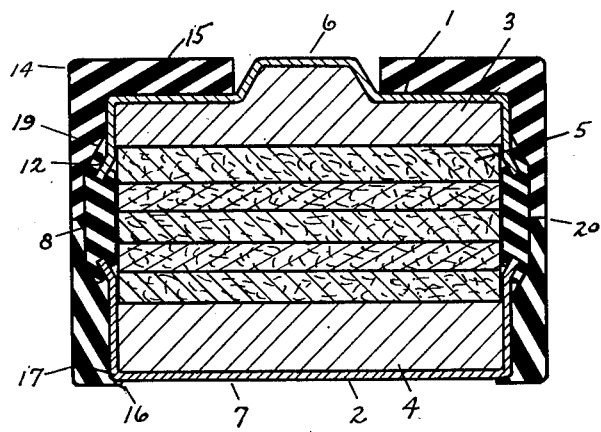
Figure 3:
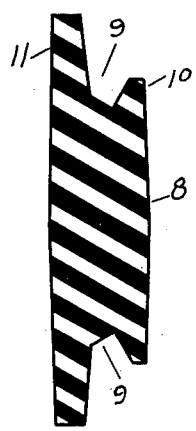

In the drawing, Fig. 1 is a section through a battery showing the parts in position for sealing, Fig. 2 is a section through a battery after sealing, and Fig. 3 is an enlarged section through the sealing gasket.

The battery has opposed cup shaped electrodes 1 and 2, the electrode 1 for example being steel and filled with compressed graphite 3 and the electrode 2 being copper and filled with mercury oxide 4. Between the electrodes are felt disks 5 saturated with a potassium hydroxide electrolyte (e. g. 40% solution). The parts so far described are typical of one form of battery cell and other batteries obviously will require different materials.

The battery terminals can be either central projections 6 as indicated at the top in Figs. 1 and 2 or the entire bottom wall 7 of the electrodes as indicated at the bottom in Figs. 1 and 2. The construction at the bottom results in approximately 10% greater capacity for the same space.

The battery so far described requires a liquid tight seal which is effected by an annular flexible or elastic sealing gasket 8 of a material inert to the battery liquids. Such materials are well known and for example can be selected from the class of elastomers of which neoprene and the vinyl resins are examples.

The gasket has a flared groove 9 at its upper and lower edges defined by inner and outer walls 10, 11 which readily receive outwardly flared lips 12 on the electrodes 1 and 2. The outer walls 11 of the gasket loosely fit within rims 13 of clamping rings 14 which fit over the ends of the electrodes 1 and 2. As shown at the top in Figs. 1 and 2, the clamping rings may have bottom walls 15 which engage the bottoms of the electrodes 1 and 2 around the projections 6. As shown at the bottom in Figs. 1 and 2 the clamping rings may be essentially flush with the bottom walls 7 of the electrodes having curved seats 16 for the outer edge 17 of the electrodes. It is not necessary to have the clamping rings 14 engage any part of the bottoms of the electrodes. It is satisfactory to have the clamping rings stop somewhere along the sides of the electrodes as indicated by dotted lines 18 at the bottom of Fig. 1. The rims 13 of the clamping rings 14 merge into inclined cam surfaces 19 which as the rings 14 are pressed together engage the outer walls 11 of the gasket 8 and compress the outer walls of the gasket against the outer surface of the electrodes and in particular against the outer surface of the flared rims 12 of the electrodes. The clamping rings 14 are preferably made from a cementable plastic such as polystyrene. By moistening the edges 20 with a suitable solvent, these edges will adhere together and produce a liquid tight seal when the clamping rings are pressed together.

In the assembly of the battery, the bottom electrode 2 is seated within the lower clamping ring 14. The gasket 8 is then loosely seated within the rim 13 of the lower clamping rings 14 and the lower groove 9 will register with the outwardly flared rim 12. In this position, the gasket is not pressed against the outwardly flaring rim 12 of the lower electrode but the inner and outer walls 10 and 11 of the gasket do straddle the rim. The felt washers 5 can now be dropped in place and the upper electrode 1 with its clamping ring 14 placed on top of the gasket 8. As shown in Fig. 1, the inner and outer walls 10 and 11 are not pressed against the rim 12 of the electrode 1 but the rim 12 merely registers with or is loosely received between the walls. Prior to the assembly, the edges 20 of the clamping rings 14 have been moistened with a suitable solvent. The assembly of the battery is completed by pressing the clamping rings 14 together until the edges 20 abut in sealing engagement and in holding the rings in this position until the plastic has set to a fluid tight seal. The setting of the joint between the edges 20 is rapid. This technique for joining plastics is known in the plastic art as cementing. As the clamping rings 14 are pressed together the inner and outer walls 10 and 11 of the gasket 8 are firmly squeezed against the outwardly flaring rims 12 of the electrodes. The greatest sealing pressure is effected by the squeezing of the outer wall 11 between the inclined cam surface 19 and the outer surface of the rim 12 and possibly to some extent the outer surface of the electrodes. The pressing of the rims 12 into the bottom of the grooves 9 also assists in bringing the walls 10 and 11 against the adjacent surfaces of the rims. In the completed assembly, the electrodes 1 and 2 are insulated by the section of the gasket 8 between the grooves 9. The clamping rings 14 also provide further electrical insulation. In the form of the invention shown at the top in Figs. 1 and 2, the clamping rings substantially completely enclose the battery except for the projections 6. In the form of the invention shown at the bottom of Figs. 1 and 2, the clamping rings provide an extended insulation beyond the upper and lower edges of the gasket 8. This insulation provides mechanical protection for the battery as well as electrical insulation. In either case, there is a fluid tight seal throughout the entire region between the cam surfaces 19.

The construction is very easy to assemble since all of the parts register and can merely be dropped in place. As the clamping rings 14 are squeezed together to bring the surfaces 20 into cementing engagement, the cam surfaces 19 squeeze the gasket against the outer surface of the electrodes and rims 12 and effect a fluid tight pressure seal. As the parts are being squeezed together, there is essentially no danger of having the parts get out of position because in the initial position the rims 12 register with the grooves 9 and as the clamping rings 14 are pressed together, the cam surfaces 19 guide the outer walls 11 of the gasket into position to grip the outer surface of the electrodes.

Since the clamping action of the rings 14 is essentially confined to the region between the cam surfaces 19, it is unnecessary that the clamping rings have walls 15 as shown at the top in Figs. 1 and 2 which extend over the bottom walls of the electrodes. This permits the use of flat bottom walls 7 on the electrodes as shown at the bottom in Figs. 1 and 2 and thereby effects an increase in the capacity of the battery for a given space. This is important in many applications such as in hearing aids where the batteries must occupy a limited space.

What I claim as new is:

1. A battery comprising a pair of opposed cup shaped electrodes with outwardly flaring rims, an annular flexible sealing member between the electrodes having inner and outer walls on its edges defining grooves receiving the electrode rims, a pair of plastic cam rings surrounding the electrodes and having cam surfaces engaging the outer walls of the sealing member and squeezing the same against the outer surface of the rims and having edges in abutting relation, and a cement joint uniting the abutting edges of the cam rings.

2. A battery comprising an annular flexible sealing member having inner and outer walls on its upper and lower edges defining grooves, opposed cup shaped electrodes having rims telescoped into the grooves, plastic cam rings telescoped over the electrodes and sealing member and having edges abutting on the outer surface of the sealing member, a cement joint uniting the abutting edges of the cam rings, and cam surfaces on the rings engaging the outer walls of the sealing member and squeezing the same against the rims.

3. A battery comprising an annular flexible sealing member having inner and outer walls on its upper and lower edges defining grooves, opposed cup shaped electrodes having rims telescoped into the grooves, plastic cam rings telescoped over the electrodes and sealing member, means holding the cam rings together, and cam surfaces on the rings engaging the outer walls of the sealing member and squeezing the same against the rims.

BRUNO C. ROEHRL.

No references cited.